(12) United States Patent
Noh et al.

(10) Patent No.: US 8,923,250 B2
(45) Date of Patent: Dec. 30, 2014

(54) METHOD AND APPARATUS FOR MAPPING A PLURALITY OF LAYERS TO A PLURALITY OF ANTENNA PORTS IN A WIRELESS COMMUNICATION SYSTEM

(75) Inventors: Min Seok Noh, Anyang-si (KR); Jae Hoon Chung, Anyang-si (KR); Hyun Soo Ko, Anyang-si (KR); Seung Hee Han, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 13/579,761

(22) PCT Filed: Feb. 21, 2011

(86) PCT No.: PCT/KR2011/001108
§ 371 (c)(1),
(2), (4) Date: Nov. 30, 2012

(87) PCT Pub. No.: WO2011/102683
PCT Pub. Date: Aug. 25, 2011

(65) Prior Publication Data
US 2013/0070732 A1    Mar. 21, 2013

Related U.S. Application Data

(60) Provisional application No. 61/305,970, filed on Feb. 19, 2010, provisional application No. 61/309,446, filed on Mar. 2, 2010.

(30) Foreign Application Priority Data

Feb. 18, 2011  (KR) .................. 10-2011-0014357

(51) Int. Cl.
| | |
|---|---|
| H04B 7/216 | (2006.01) |
| H04B 7/00 | (2006.01) |
| G01R 31/08 | (2006.01) |
| H04J 4/00 | (2006.01) |
| H04J 3/16 | (2006.01) |
| H04L 5/00 | (2006.01) |
| H04J 13/18 | (2011.01) |
| H04B 7/04 | (2006.01) |

(52) U.S. Cl.
CPC ............ *H04L 5/0016* (2013.01); *H04L 5/0023* (2013.01); *H04B 7/0473* (2013.01); *H04L 5/0048* (2013.01); *H04J 13/18* (2013.01)
USPC ........... 370/335; 370/277; 370/230; 370/436; 370/469

(58) Field of Classification Search
CPC .................. H04B 7/2628; H04B 2201/70701; H04B 2201/70702; H04L 5/14; H04L 47/10; H04L 29/06095
USPC ......................................................... 370/335
See application file for complete search history.

(56) References Cited

U.S. PATENT DOCUMENTS

| | | | |
|---|---|---|---|
| 2006/0276212 | A1 | 12/2006 | Sampath et al. |
| 2007/0270170 | A1 | 11/2007 | Yoon et al. |

(Continued)

FOREIGN PATENT DOCUMENTS

| | | |
|---|---|---|
| JP | 2013-516858 A | 5/2013 |
| WO | WO 2008/115588 A2 | 9/2008 |
| WO | WO 2011/082543 A1 | 7/2011 |

OTHER PUBLICATIONS

Ericsson et al., "Layer-to-DM RS port mapping for LTE-Advanced", 3GPP TSG-RAN WG1 #59bis, R1-100050, Valencia, Spain, Jan. 18-22, 2010, 5 pages.

(Continued)

*Primary Examiner* — Faruk Kamza
*Assistant Examiner* — Abu-Sayeed Haque
(74) *Attorney, Agent, or Firm* — Birch, Stewart, Kolasch & Birch, LLP

(57) ABSTRACT

Provided are a method and apparatus for allocating a plurality of layers to a plurality of antenna ports in a wireless communication system. The method comprises: mapping the plurality of layers to the respective antenna ports; and mapping demodulation reference signals (DMRS) of the plurality of layers to a first code division multiplexing (CDM) set or to a second CDM set, and transmitting the signals via the plurality of antenna ports.

12 Claims, 23 Drawing Sheets

(56) References Cited

U.S. PATENT DOCUMENTS

| 2009/0074103 | A1 | 3/2009 | Varadarajan et al. | |
| 2009/0190687 | A1 | 7/2009 | Moon et al. | |
| 2010/0039970 | A1* | 2/2010 | Papasakellariou et al. | 370/310 |
| 2010/0041350 | A1* | 2/2010 | Zhang et al. | 455/101 |
| 2010/0067512 | A1* | 3/2010 | Nam et al. | 370/342 |
| 2010/0080135 | A1* | 4/2010 | Ishii et al. | 370/252 |
| 2010/0097937 | A1* | 4/2010 | Pietraski et al. | 370/241 |
| 2012/0287966 | A1 | 11/2012 | Wang et al. | |
| 2013/0034178 | A1* | 2/2013 | Hu et al. | 375/267 |

OTHER PUBLICATIONS

Research in Motion, UK Limited, "Downlink DM-RS Design Considerations for LTE-A", 3GPP TSG RAN WG1 Meeting #58b, R1-094106, Miyazaki, Japan, Oct. 12-16, 2009, pp. 1-9.

Samsung, "Discussion on Layer to DMRS mapping", 3GPP TSG RAN WG1 #60, R1-101154, San Francisco, USA, Feb. 22-26, 2010, 3 pages.

Samsung; Discussion on Layer to DMRS mapping, 3GPP TSG RAN WG1 #59bis, R1-100112, Jan. 18-22, 2010, 3 pages.

* cited by examiner

FIG. 5
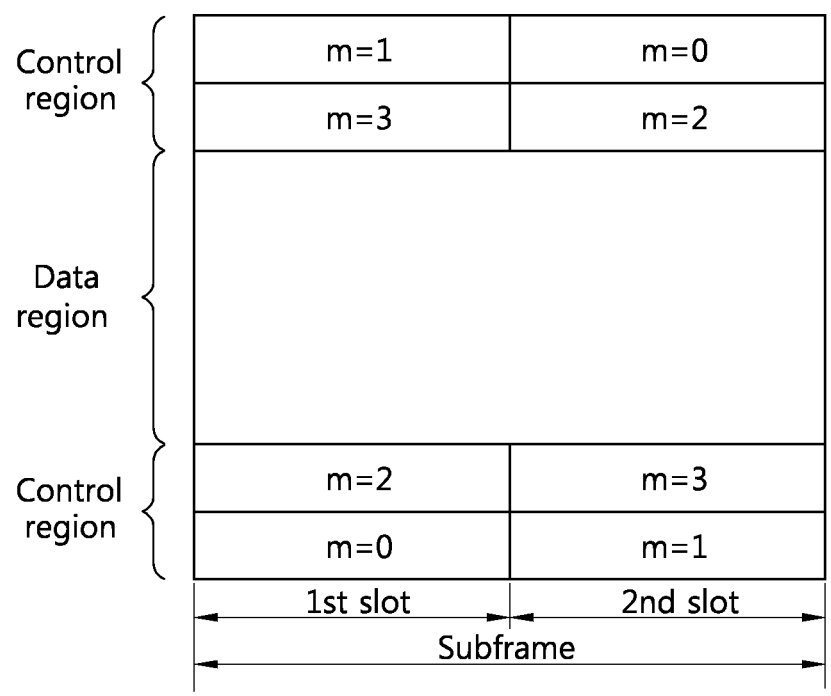
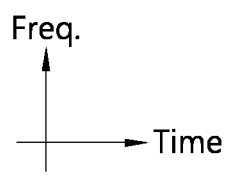

FIG. 16
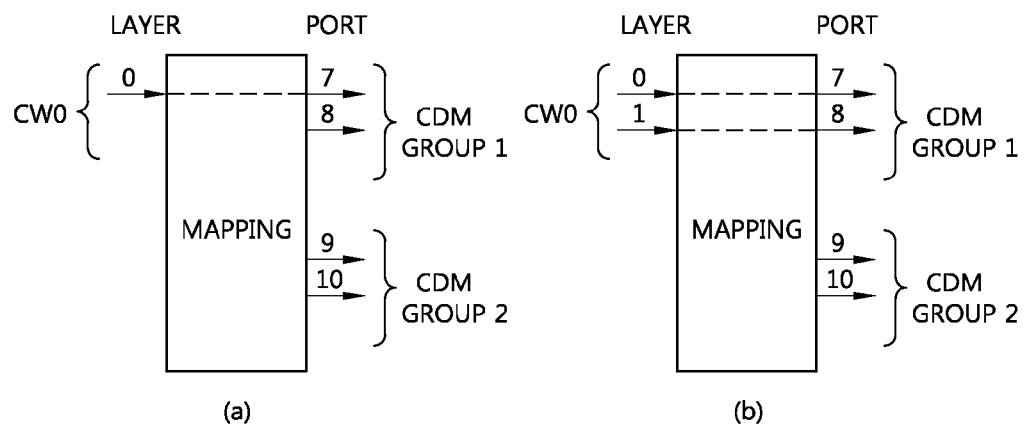
(a)    (b)
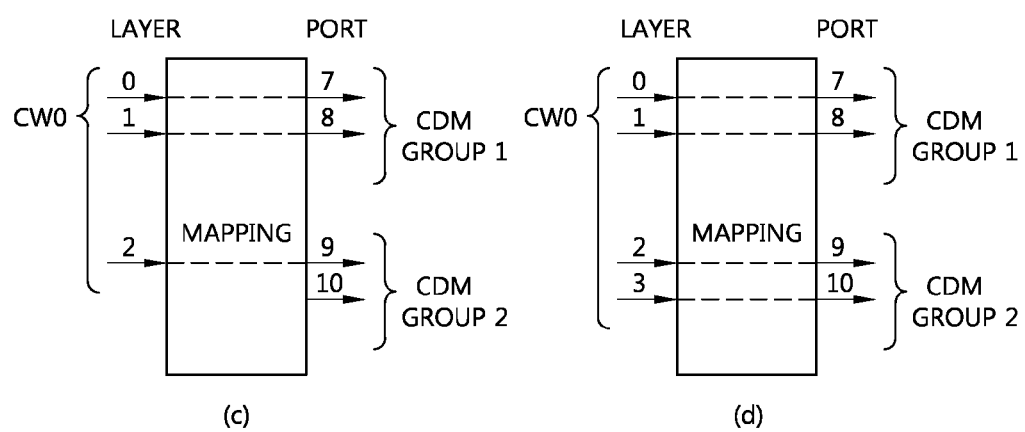
(c)    (d)

METHOD AND APPARATUS FOR MAPPING A PLURALITY OF LAYERS TO A PLURALITY OF ANTENNA PORTS IN A WIRELESS COMMUNICATION SYSTEM

CROSS REFERENCE TO RELATED APPLICATIONS

This application is the National Phase of PCT/KR2011/001108 filed on Feb. 21, 2011, which claims priority under 35 U.S.C. 119(e) to U.S. Provisional Application Nos. 61/305,970 filed on Feb. 19, 2010 and 61/309,446 filed on Mar. 2, 2010, and under 35 U.S.C. 119(a) to Patent Application No. 10-2011-0014357 filed in the Republic of Korea on Feb. 18, 2011, all of which are hereby expressly incorporated by reference into the present application.

BACKGROUND OF THE INVENTION

1. Field of the Invention

The present invention relates to wireless communication and, more specifically, to a method and apparatus for mapping a plurality of layers to a plurality of antenna ports in a wireless communication system.

2. Related Art

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h}=y/p=h+n/p=h+\hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

A downlink RS may include a cell-specific RS (CRS), an MBSFN RS, a UE-specific positioning RS (PRS), and a channel state information RS (CSI-RS). The UE-specific RS is an RS received by a specific UE or a specific UE group within a cell. The UE-specific RS is chiefly used for the data demodulation of a specific UE or a specific UE group and thus may be called a demodulation RS (DMRS).

Meanwhile, a DMRS for a plurality of layers can be transmitted. The DMRSs for the plurality of layers are mapped to a resource element (RE) within a resource block (RB), and the DMRSs mapped to the RB can be transmitted through a plurality of antenna ports. In $3^{rd}$ generation partnership project (3GPP) long term evolution advanced (LTE-A), a maximum of eight layers are supported and thus a plurality of layers and a plurality of antenna ports can be mapped in various manners.

There is a need for a layer-antenna port mapping method for effective DMRS transmission.

SUMMARY OF THE INVENTION

The present invention provides a method and apparatus for mapping a plurality of layers to a plurality of antenna ports in a wireless communication system In an aspect, a method of allocating a plurality of layers to a plurality of antenna ports in a wireless communication system is provided. The method includes mapping the plurality of layers to the plurality of antenna port, respectively, and mapping demodulation reference signals (DMRSs) of the plurality of layers to a first code division multiplexing (CDM) set or a second CDM set and transmitting the DMRSs through the plurality of antenna ports.

the DMRSs mapped to a first CDM set in a first resource block (RB), from among the DMRSs of the plurality of layers, may be mapped to a second CDM set in a second RB different from the first RB, and the DMRSs mapped to a second CDM set in the first RB, from among the DMRSs of the plurality of layers, may be mapped to a first CDM set in the second RB different from the first RB.

A number of the plurality of layers may be an odd number.

The DMRSs of the plurality of layers may be mapped to a predetermined CDM set irrespective of a number of the plurality of layers.

The first CDM set or the second CDM set may be mapped to predetermined specific antenna ports of the plurality of antenna ports irrespective of the number of the plurality of layers.

Antenna ports mapped to the first CDM set and antenna ports mapped to the second CDM set may be mutually exclusively.

the first CDM set may occupy a resource element (RE) allocated to first, sixth, and eleventh subcarriers of sixth and seventh orthogonal frequency division multiplexing (OFDM) symbols of each slot, and the second CDM set may occupy an RE allocated to second, seventh, and twelfth subcarriers of sixth and seventh OFDM symbols of each slot.

A maximum of four layers in the first CDM set or the second CDM set may be multiplexed according to a CDM scheme based on an orthogonal code.

A length of the orthogonal code may be 4.

The DMRSs of the plurality of layers may be transmitted with identical power.

In another aspect, an apparatus in a wireless communication system is provided. The apparatus includes a radio frequency (RF) unit for transmitting demodulation reference signals (DMRSs) of a plurality of layers through a plurality of antenna ports, and a processor connected to the RF unit, wherein the processor is configured for mapping the plurality of layers to the plurality of antenna ports, respectively, and mapping the DMRSs of the plurality of layers to a first code division multiplexing (CDM) set or a second CDM set.

Power imbalance between the DMRSs of a plurality of layers can be solved.

BRIEF DESCRIPTION OF THE DRAWINGS

FIG. 5 shows the structure of an uplink subframe.
FIG. 16 shows another example of layer-antenna port mapping according to a proposed invention.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
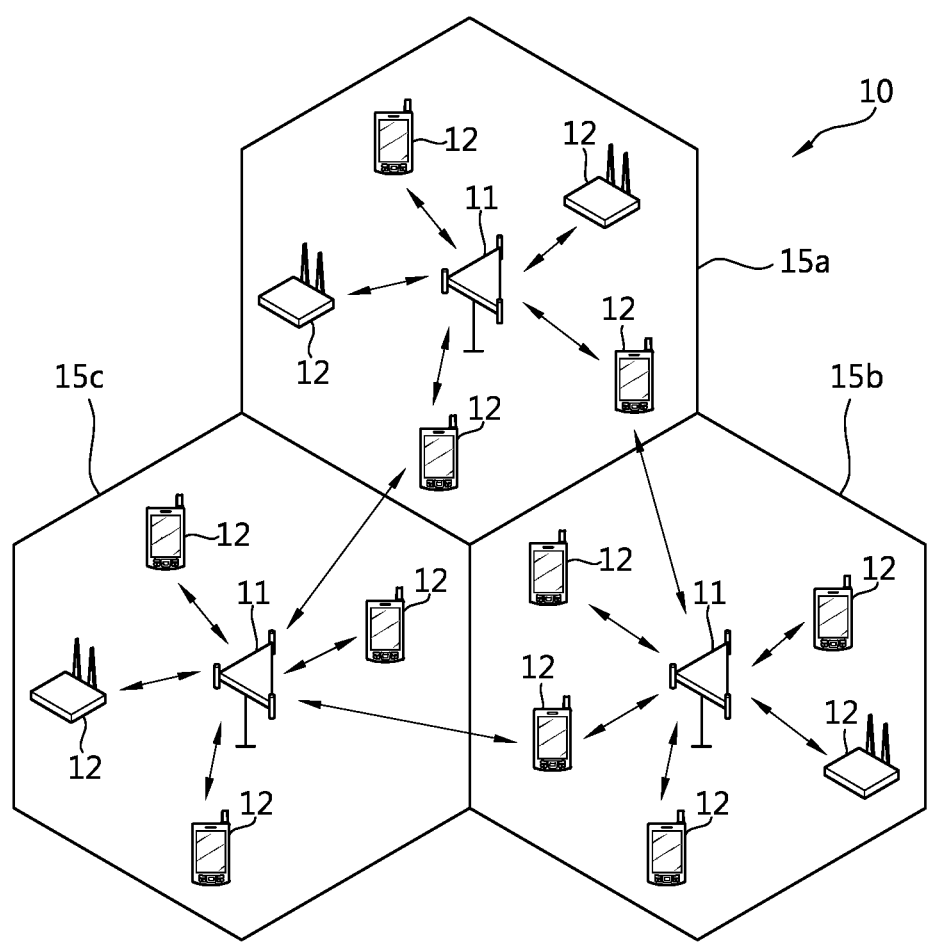
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
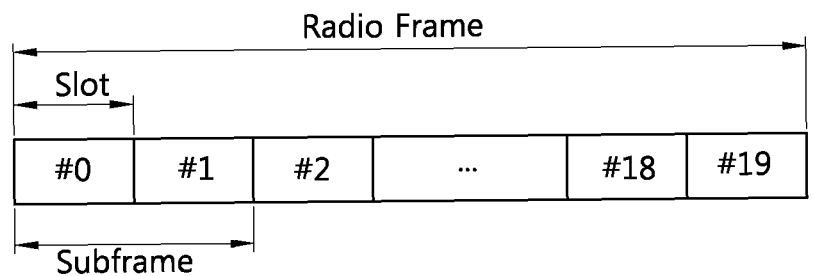
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when a single carrier frequency division multiple access (SC-FDMA) is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
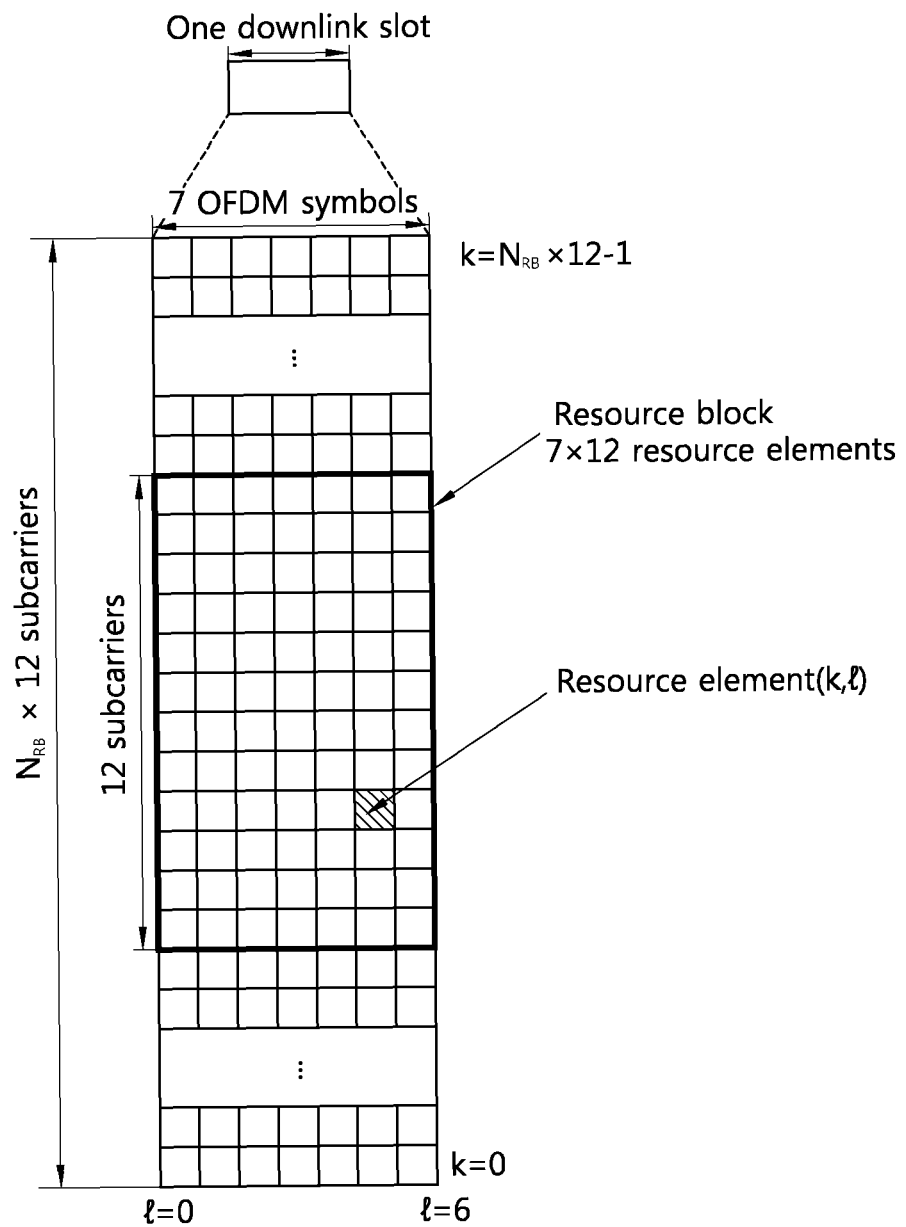
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
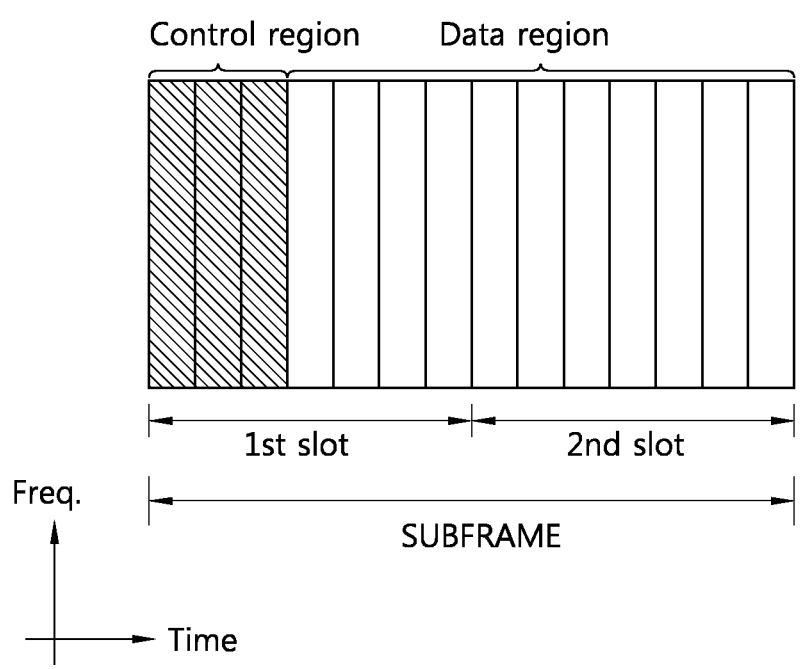
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUCCH for one UE is allocated in an RB pair. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

Uplink control information transmitted on the PUCCH may include a HARQ ACK/NACK, a channel quality indicator (CQI) indicating the state of a downlink channel, a scheduling request (SR) which is an uplink radio resource allocation request, and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A reference signal can be classified into a cell-specific reference signal (CRS), an MBSFN reference signal, a user equipment-specific reference signal (UE-specific RS), a position reference signal (PRS) and a channel state information reference signal (CSI-RS).

First, a CRS is described. The CRS is transmitted to all the UEs within a cell and used for channel estimation. The CRS may be transmitted all downlink subframes within a cell which supports the PUSCH transmission.

Figure 6:
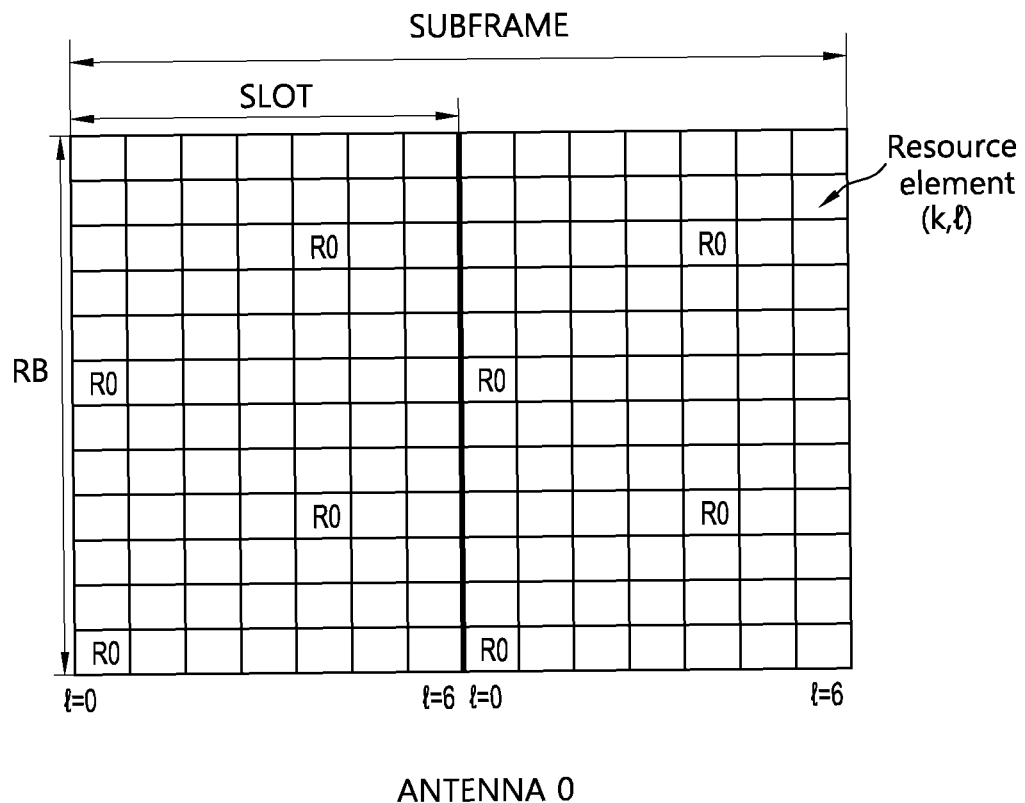
FIGS. 6 to 8 show an exemplary CRS structure.
Figure 7:
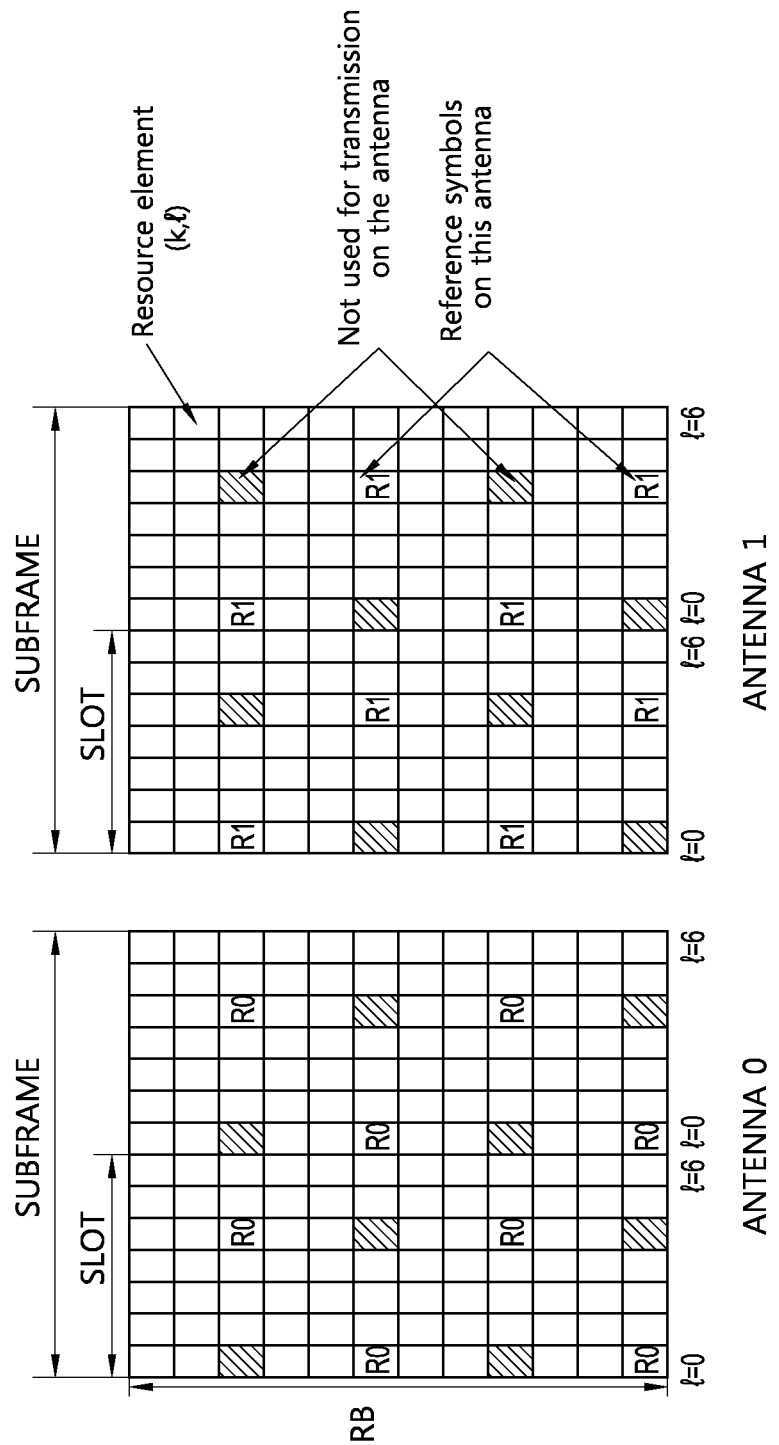
Figure 8:
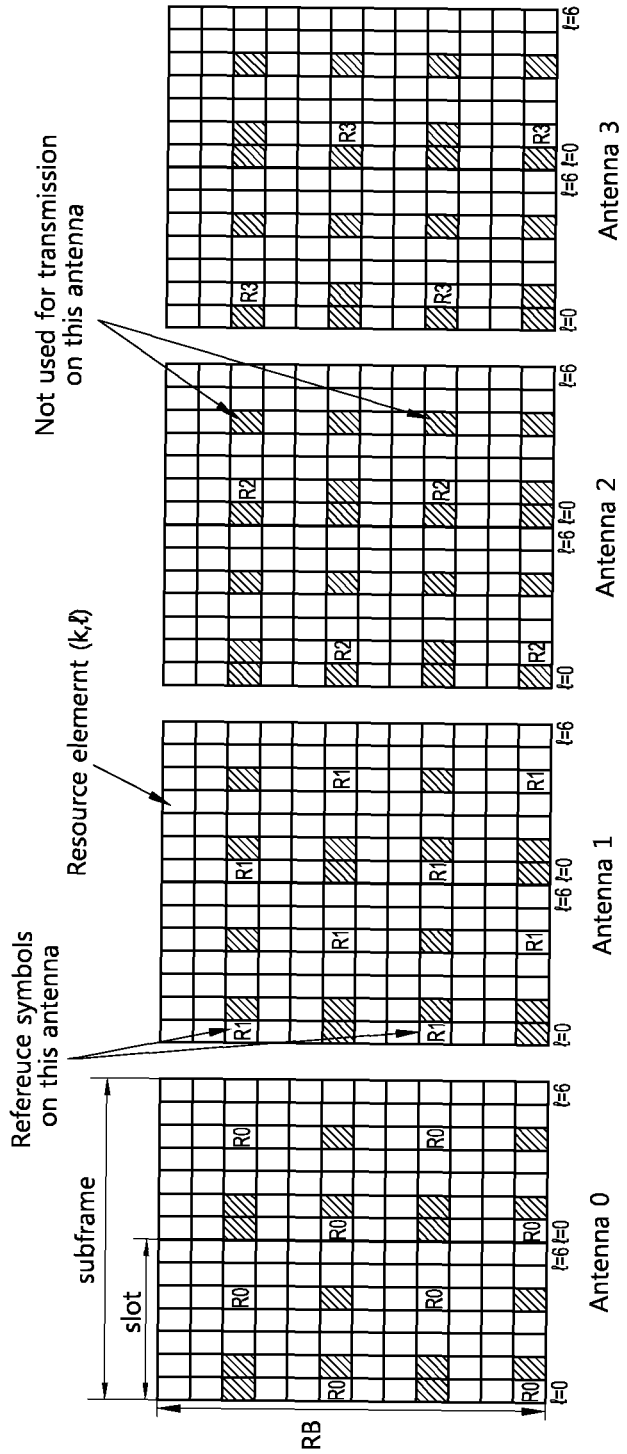

FIGS. 6 to 8 show an exemplary CRS structure.

FIG. 6 shows an exemplary CRS structure when a BS uses one antenna. FIG. 7 shows an exemplary CRS structure when a BS uses two antennas. FIG. 8 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Also, the CRS CRS may be used for a channel quality estimation, a CP detection, time/frequency synchronization, etc.

Referring to FIG. 6 to FIG. 8, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index t, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is 0, 1, . . . , $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 3 shows an example of a gold sequence c(n).

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2 \times N_{RB}$ can be selected from an RS sequence generated in a length of $2 \times N_{RB,max}$.

A MBSFN reference signal is a reference signal for providing a multimedia broadcast multicast service (MBMS). The MBSFN reference signal can only be transmitted in sub-frames allocated for MBSFN transmission. The MBSFN reference signal may only be defined in the extended CP structure.

A UE-specific reference signal is described below. The UE-specific reference signal is received by a specific UE or a specific UE group within a cell. The UE-specific reference signal may be referred to a demodulation reference signal (DMRS) since the UE-specific reference signal is chiefly used by a specific UE or a specific UE group for the purpose of data demodulation.

Figure 9:
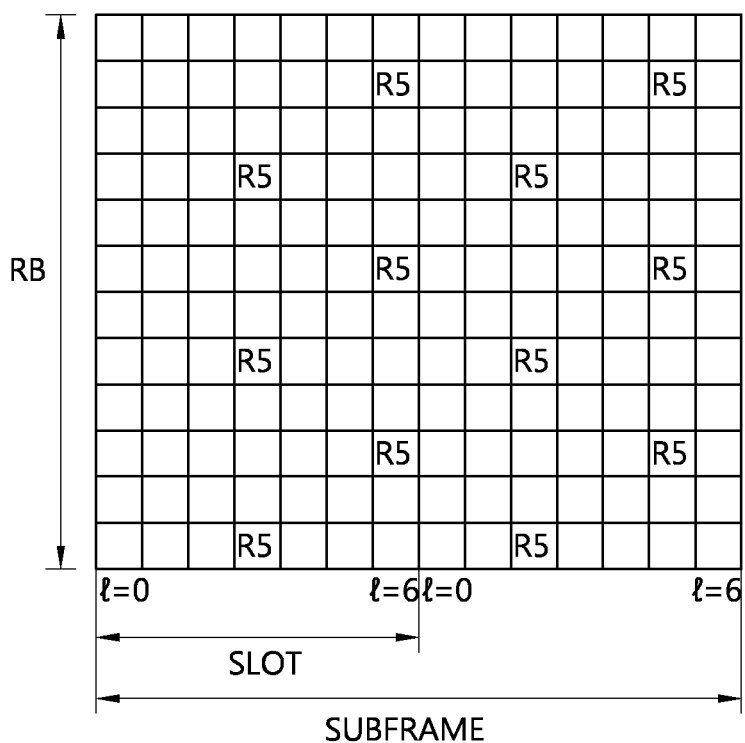
FIGS. 9 and 10 show examples of a DMRS structure.
Figure 10:
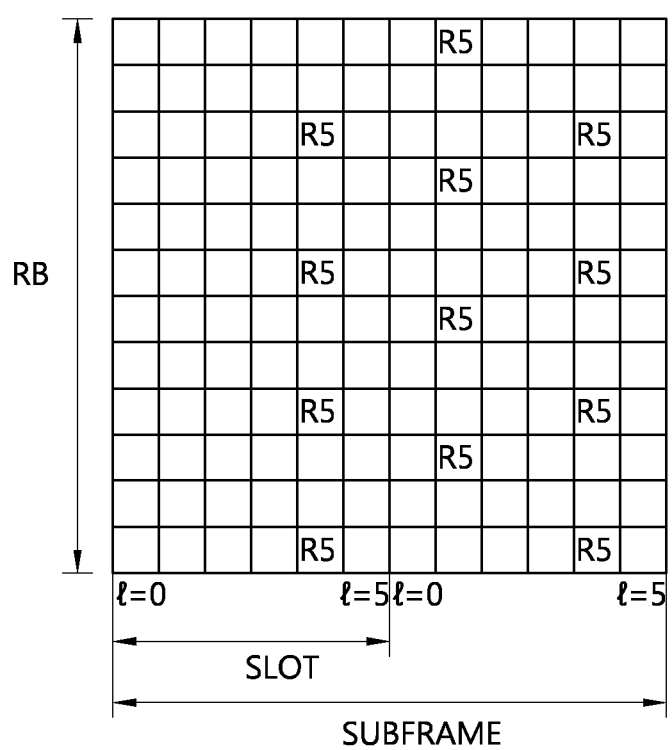

FIGS. 9 and 10 show examples of a DMRS structure.

FIG. 9 shows an example of the DMRS structure in the normal CP (Cyclic Prefix). In the normal CP, a subframe includes 14 OFDM symbols. R5 indicates the reference signal of an antenna which transmits a DMRS. On one OFDM symbol including a reference symbol, a reference signal subcarrier is positioned at intervals of four subcarriers. FIG. 10 shows an example of the DMRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DMRS can be determined by a resource block assigned for PDSCH transmission. A DMRS sequence can be determined by a UE ID, and only a specific UE corresponding to the UE ID can receive a DMRS.

A DMRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DMRS sequence can be changed according to $N_{RB}^{PDSCH}$. That is, the length of a DMRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DMRS sequence can be generated for every subframe and applied for every OFDM symbol. It is assumed that the number of reference signal subcarriers per resource block is 12 and the number of resource blocks is $N_{RB}^{PDSCH}$, within one subframe. The total number of reference signal subcarriers is $12 \times N_{RB}^{PDSCH}$. Accordingly, the length of the DMRS sequence is $12 \times N_{RB}^{PDSCH}$. In the case in which DMRS sequences are generated using Equation 2, m is 0, 1, ..., $12 N_{RB}^{PDSCH} - 1$. The DMRS sequences are sequentially mapped to reference symbols. The DMRS sequence is first mapped to the reference symbol and then to a next OFDM symbol, in ascending powers of a subcarrier index in one OFDM symbol.

Further, the CRS can be used together with a DMRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DMRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

Figure 11:
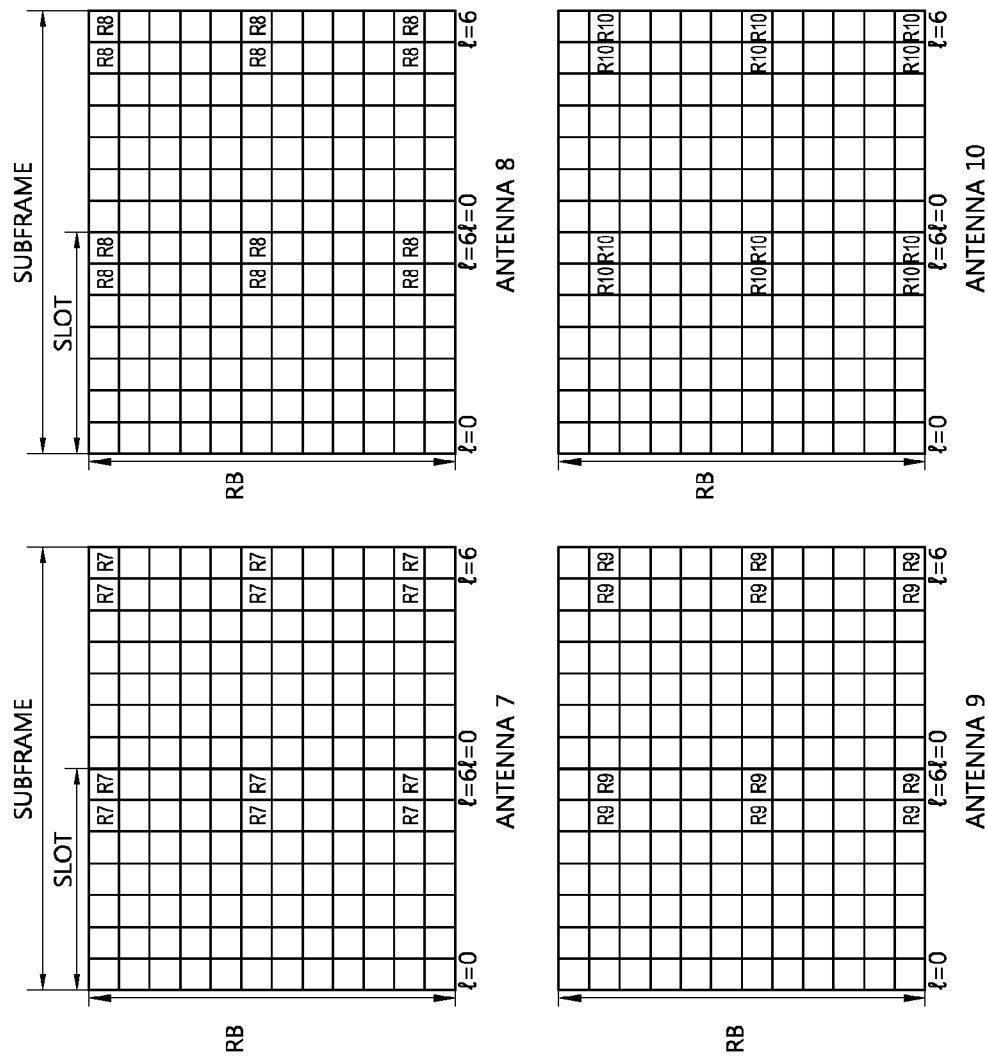
FIGS. 11 and 12 show other examples of patterns in which DMRSs are mapped to an RB.
Figure 12:
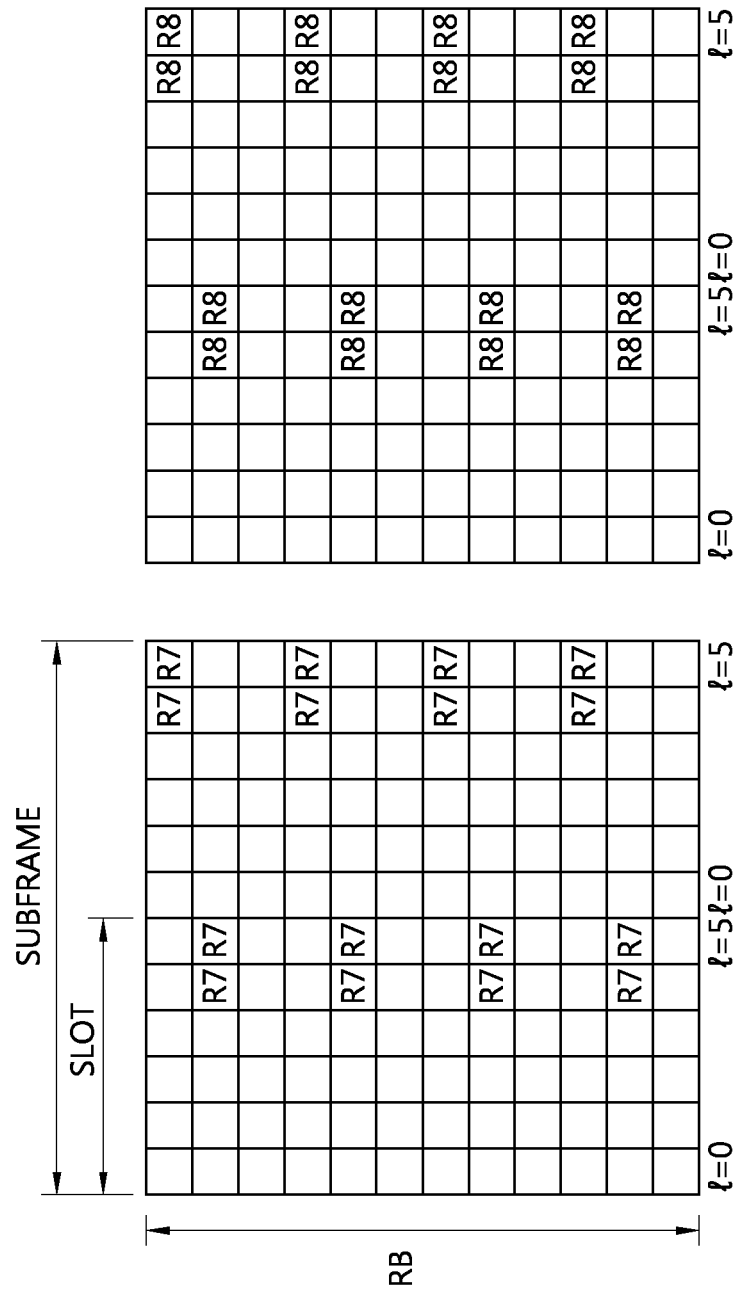

FIGS. 11 and 12 show other examples of patterns in which DMRSs are mapped to an RB.

FIG. 11 shows an example of a pattern in which DMRSs are mapped to an RB in a normal CP structure. 'R7' to 'R10' show the DMRSs of antenna ports 7 to 10. The DMRSs of the antenna port 7 and the antenna port 8 are mapped to the same resource element and are multiplexed by a code division multiplexing (CDM) scheme according to an orthogonal code. Likewise, the DMRSs of the antenna port 9 and the antenna port 10 are mapped to the same resource element and are multiplexed by a CDM scheme according to an orthogonal code. In FIG. 11, the 12 REs to which the DMRSs of the antenna port 7 and the antenna port 8 are mapped may be represented by a first CDM set (or a first CDM group), and the 12 REs to which the DMRSs of the antenna port 9 and the antenna port 10 are mapped may be represented by a second CDM set (or a second CDM group). FIG. 12 shows an example of a pattern in which DMRSs are mapped to an RB in an extended CP structure. Like in FIG. 11, in FIG. 12, the DMRSs of the antenna port 7 and the antenna port 8 are mapped to the same resource element and are multiplexed by a CDM scheme according to an orthogonal code.

Figure 13:
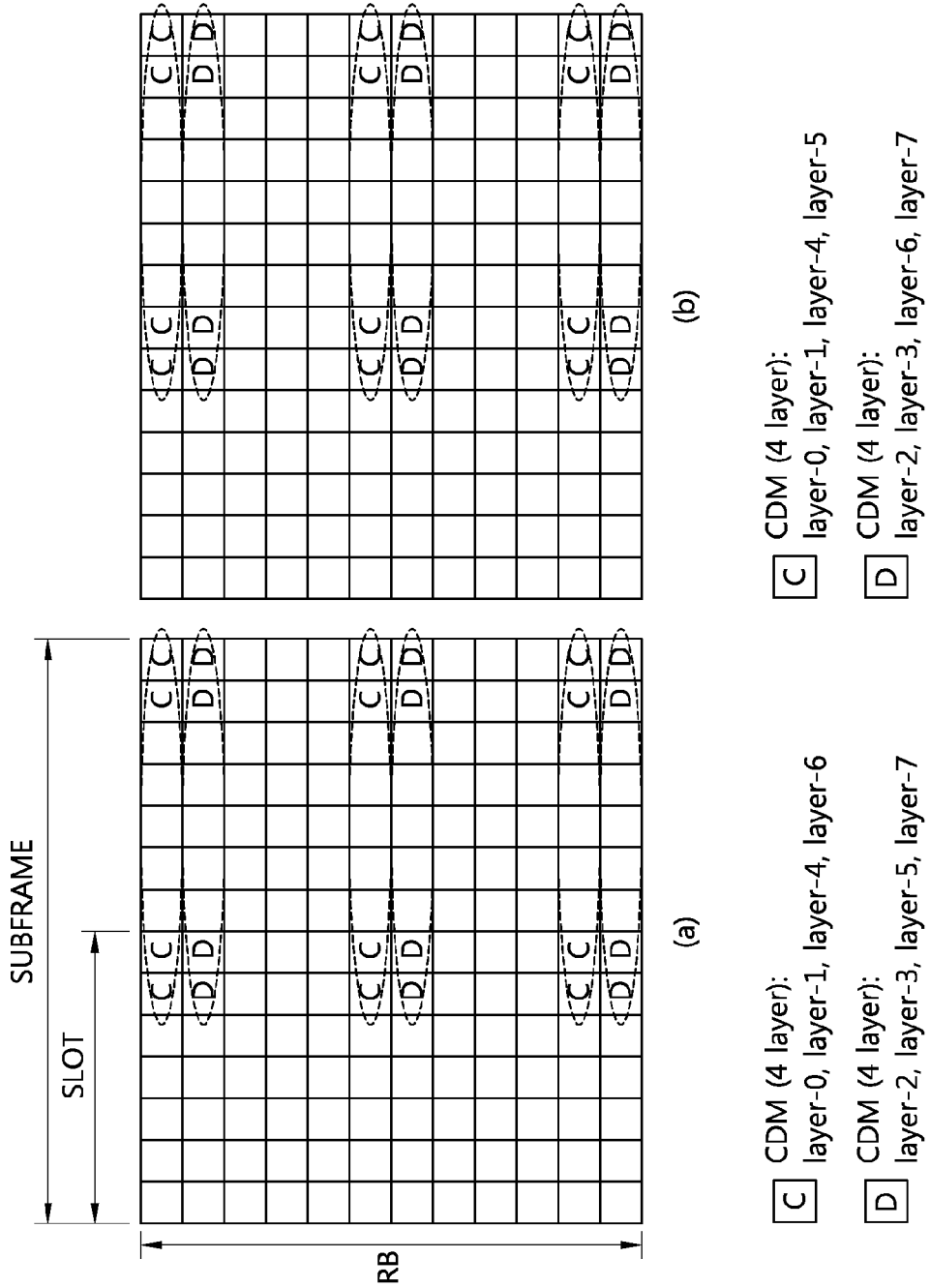
FIG. 13 shows another example of a pattern in which DMRSs are mapped to an RB.

FIG. 13 shows another example of a pattern in which DMRSs are mapped to an RB.

FIG. 13 shows an example of a pattern in which the DMRSs of each layer are mapped when the number of layers is a maximum of 8. In FIG. 13-(a), the DMRSs of the layers 0, 1, 4 and 6 are mapped to a first CDM set 'C', and the DMRSs of the layers 2, 3, 5 and 7 are mapped to a second CDM set 'D'. In FIG. 13-(b), the DMRSs of the layers 0, 1, 4 and 5 are mapped to a first CDM set 'C', and the DMRSs of the layers 2, 3, 6 and 7 are mapped to a second CDM set 'D'. Here, the DMRSs of each layer within each CDM set may be multiplexed by a CDM scheme according to an orthogonal cover code (OCC) having a length of 4 in the time domain.

Meanwhile, from a viewpoint of power imbalance between layers or power boosting, the DMRS pattern of FIG. 13-(a) may be advantageous over the DMRS pattern of FIG. 13-(b). For example, if the number of layers is 6, link performance within each CDM set may be reduced owing to power imbalance between the DMRSs of each layer that belong to each CDM set. In the case of the DMRS pattern of FIG. 13-(b), the DMRSs of four layers are mapped to a first CDM set, and the DMRSs of two layers are mapped to a second CDM set. Thus, the DMRSs of the layers mapped to the second CDM set can be transmitted with power twice greater than the DMRSs of the layers mapped to the first CDM set. Accordingly, channel estimation performance through the DMRSs of the layers 0, 1, 4 and 5 may be deteriorated. In contrast, in the case of the DMRS pattern of FIG. 13-(a), the DMRSs mapped to each CDM set can be transmitted with the same power because the DMRSs of three layers are mapped to both the first CDM set and the second CDM set. Accordingly, there is no difference in channel estimation performance between the DMRSs of a plurality of layers.

A PRS may be used to measure the position of UE. The PRS may be transmitted through an RB within a downlink subframe allocated for PRS transmission.

A CSI-RS may be used to estimate CSI. The CSI-RS is sparsely disposed in the frequency domain or the time domain and may be punctured in the data region of a normal subframe or a multimedia broadcast and multicast single frequency network (MBSFN) subframe. A channel quality indicator (CQI), a precoding matrix indicator (PMI), and a rank indicator (RI) may be reported by UE according to circumstances through the estimation of CSI.

If the above-described DMRS pattern is used when mapping a layer to an antenna port, the total number of REs to which DMRSs are mapped to each RB may vary depending on the number of layers that are transmitted in an allocated RB. Hereinafter, a layer may be mixed and used together with a rank or stream. For example, if the number of layers scheduled within one RB is one or two, the number of REs used for DMRS transmission within an RB may be 12, that is, one CDM set according to FIG. 9 or FIG. 10. The DMRSs of a plurality of layers may be multiplexed with one CDM set by an orthogonal code and then mapped. Or, if the number of layers scheduled within one RB is three or more, the number of REs used for DMRS transmission within an RB may be 24, that is, two CDM sets according to FIG. 11 or FIG. 12. If the number of layers is one or two, there is no ambiguity in mapping the DMRSs of one or two layers to an RE. This is because there is only one CDM set in one RB and the DMRSs of a maximum of two layers can be multiplexed with one CDM set. In contrast, if the number of layers is three or more, a variety of methods of mapping the layers to antenna ports may be taken into consideration. For example, if the number of layers is three, the DMRSs of the two layers may be multiplexed with and mapped to one of two CDM sets and only the DMRS of one layer may be mapped to the remaining one CDM set. That is, there is ambiguity when mapping the DMRSs of three layers to two CDM sets. Accordingly, there is a need for a new method of mapping layers to antenna ports when the number of layers is three or more.

Meanwhile, in single layer beamforming of LTE rel-8 or dual layer beamforming of LTE rel-9, the energy per resource element (EPRE) of the DMRS of an antenna port 5, 7, or 8 is configured to be identical with the EPRE of a PDSCH. In LTE-A, the number of antenna ports may be extended up to a maximum of 8. Furthermore, if the number of layers is three or more, each antenna port may transmit a PDSCH or a DMRS by using only nine subcarriers of twelve subcarriers that form one RB within an OFDM symbol. Accordingly, in LTE-A, if the number of layers is three or more, a ratio of the EPRE of a DMRS and the EPRE of a PDSCH in each antenna port needs to be newly defined. For example, in an OFDM symbol including DMRSs, the EPRE of the DMRS may be defined to be twice the EPRE of a PDSCH. This may be applied to the case where a ratio of the EPRE of the DMRS and the EPRE of the PDSCH is the same in all the layers and power not used to allocate an antenna port through which a signal is not transmitted is allocated as an antenna port through which a signal is transmitted. It is hereinafter assumed that power between layers is the same.

Figure 14:
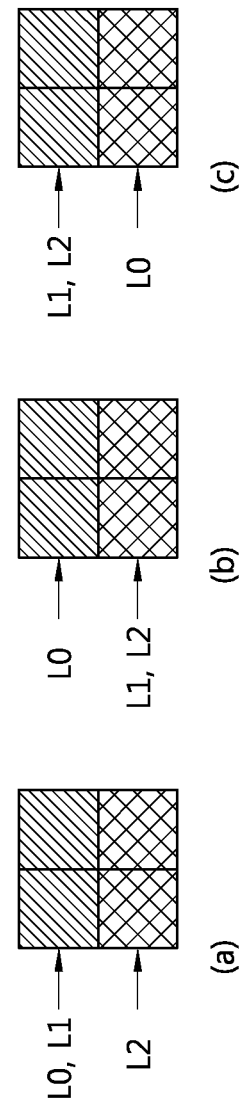
FIG. 14 shows an example of layer-antenna port mapping when the number of layers is 3.

FIG. 14 shows an example of layer-antenna port mapping when the number of layers is 3.

FIG. 14 shows only REs to which DMRSs are mapped in the DMRS pattern of FIG. 11. That is, the RE of FIG. 14 may be any one of the first and the second subcarriers, the sixth and the seventh subcarriers, and the eleventh and the twelfth subcarriers of sixth and seventh OFDM symbols or thirteenth and fourteenth OFDM symbols.

In FIG. 14-(*a*), a layer 0 and a layer 1 are mapped to a first CDM set mapped to antenna ports 7 and 8, and a layer 2 is mapped to a second CDM set mapped to antenna ports 9 and 10. Assuming that the three layers have the same power and the first CDM set to which the DMRSs of the two layers are mapped transmits the DMRSs using power twice greater than the second CDM set to which the DMRS of one layer is mapped, this may give great interference to the DMRSs mapped to the same CDM set of another cell. Furthermore, assuming that two codewords are transmitted, a layer 0 transmits the first codeword, and layers 1 and 2 transmit the second codeword, the DMRSs of the two layers that transmit the second codeword are mapped to different CDM sets. Accordingly, inter-cell interference or intra-cell interference may occur.

In FIG. 14-(*b*), a layer that transmits each codeword is mapped to each CDM set without change. For example, the DMRS of a layer 0 that transmits a first codeword is mapped to a first CDM set, and the DMRSs of layers 1 and 2 that transmit a second codeword are mapped to a second CDM set. Accordingly, when using a successive interference cancellation (SIC) decoder, a channel associated with the first codeword can be estimated more precisely, and UE may first decode the first codeword having better channel estimation performance. Furthermore, the raised power of the second CDM set to which the DMRSs of two layers are mapped may not give interference to the DMRSs of another cell.

Table 1 shows an example of a method for mapping layers to antenna ports when the number of layers is any one of 3 to 8. In Table 1, 'top' may indicate a first CDM set, and 'bottom' may indicate a second CDM set. Table 1 is only illustrative, and layers may be mapped to antenna ports according to any combination.

TABLE 1

|  | Alt 1 | Alt 2 |
|---|---|---|
| Rank 3 | L0, L1 on the top | L0 on the top |
|  | L2 on the bottom | L1, L2 on the bottom |
| Rank 4 | L0, L1 on the top | L0, L1 on the top |
|  | L2, L3 on the bottom | L2, L3 on the bottom |
| Rank 5 | L0, L1, L2 on the top | L0, L1 on the top |
|  | L3, L4 on the bottom | L2, L3, L4 on the bottom |
| Rank 6 | L0, L1, L2 on the top | L0, L1, L2 on the top |
|  | L3, L4, L5 on the bottom | L3, L4, L5 on the bottom |
| Rank 7 | L0, L1, L2, L3 on the top | L0, L1, L2 on the top |
|  | L4, L5, L6 on the bottom | L3, L4, L5, L6 on the bottom |
| Rank 8 | L0, L1, L2, L3 on the top | L0, L1, L2, L3 on the top |
|  | L4, L5, L6, L7 on the bottom | L4, L5, L6, L7 on the bottom |

The two methods described above with reference to FIG. 14-(*c*) may be determined in a cell-specific or UE-specific way and applied. This is for the purpose of further reducing inter-cell interference.

However, the method for mapping layers to antenna ports described with reference to FIG. 14 may have different performance in each layer depending on power imbalance between the DMRSs of layers, and thus the link performance of layers allocated to a specific CDM set may be reduced. Accordingly, there is a need for a new method of mapping layers to antenna ports.

Figure 15:
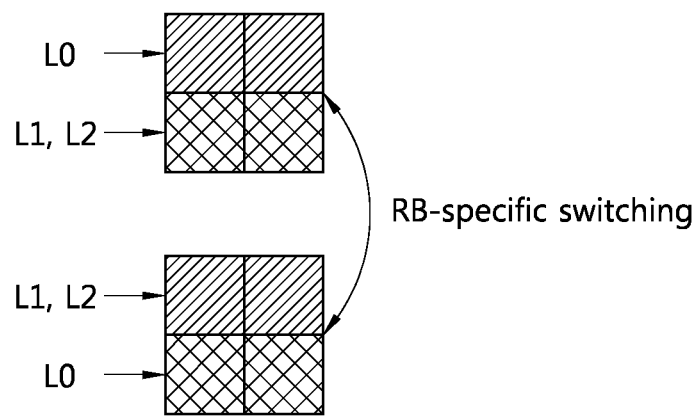
FIG. 15 shows an example of layer-antenna port mapping according to a proposed invention.

FIG. 15 shows an example of layer-antenna port mapping according to a proposed invention.

Referring to FIG. 15, the two methods described with reference to FIGS. 14-(*a*) and 14-(*b*) may be alternately applied for each RB. That is, assuming that three layers are mapped to two antenna ports, in a first RB, the DMRS of the layer 0 is mapped to a first CDM set, and the DMRSs of layers 1 and 2 are mapped to a second CDM set. In a second RB, the DMRSs of layers 0 and 1 may be mapped to a first CDM set, and the DMRS of a layer 2 may be mapped to a second CDM set. Accordingly, if even-numbered RBs are allocated, the power imbalance problem can be solved by equally allocating power between the DMRSs of a plurality of layers in each OFDM symbol. If the number of RBs is an odd number, the power imbalance problem may remain unsolved.

Meanwhile, a specific layer may be always mapped to the same antenna port irrespective of the number of layers according to a proposed invention. Accordingly, UE does not need to use different channel estimators depending on the number of layers in order to estimate the channel of a specific layer. Accordingly, the complexity of channel estimation can be reduced.

In a method of mapping a plurality of layers to a plurality of antenna ports described below, for a codeword-layer mapping relationship, reference may be made to Paragraph 6.3.3.2 of 3GPP TS 36.211 V9.0.0 (2009-12). Furthermore, reference may be made to Paragraph 7.2 of 3GPP TS 33.814 V1.5.0 (2009-11).

Paragraph 6.3.3.2 of 3GPP TS 36.211 V9.0.0 (2009-12) describes layer mapping in spatial multiplexing. In spatial multiplexing, a codeword-layer mapping relationship may comply with Table 2. The number of layers may be equal to or smaller than the number of antenna ports used to transmit a physical channel.

TABLE 2

| Number of layers | Number of code-words | Codeword-to-layer mapping $i = 0, 1, \ldots M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$<br>$x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$<br>$x^{(1)}(i) = d^{(0)}(2i + 1)$<br>$x^{(2)}(i) = d^{(1)}(2i)$<br>$x^{(3)}(i) = d^{(1)}(2i + 1)$ | $M_{symb}^{layer} = M_{symb}^{(0)}/2 = M_{symb}^{(1)}/2$ |

Paragraph 7.2 of 3GPP TS 36.814 V1.5.0 (2009-11) describes downlink spatial multiplexing. In LTE-A, downlink spatial multiplexing for a maximum of eight layers can be supported. In spatial multiplexing in which eight layers are allocated to a plurality of users, a maximum of two transport blocks may be transmitted to UE that has been scheduled in a subframe per a downlink component carrier (CC). Each transport block may be allocated according to a different modulation and coding scheme (MCS). For hybrid automatic repeat request (HARQ) feedback in uplink, 1 bit of each transport block may be used. The transport block is connected to a codeword. Regarding a maximum of four layers, codeword-layer mapping may comply with Table 2. If one codeword is mapped to three or four layers or the number of layers is four or more, codeword-layer mapping may comply with Table 3. If one codeword is mapped to three or four layers, one of two codewords transmitted through four or more layers may be retransmitted. In accordance with Table 3, $d^{(q)}(0), \ldots, d^{(q)}(M_{symb}^{(q)}-1)$, that is, the complex modulation symbol of a codeword q is mapped like a layer $x(i) = [x^{(0)}(i) \ldots x^{(v-1)}(i)]^T$, $i = 0, 1, \ldots, M_{symb}^{layer}-1$, v is the number of layers, and $M_{symb}^{layer}$ is the number of modulation symbols per layer.

TABLE 3

| Number of layers | Number of code-words | Codeword-to-layer mapping $i = 0, 1, \ldots M_{symb}^{layer} - 1$ | |
|---|---|---|---|
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |

TABLE 3-continued

| Number of layers | Number of code-words | Codeword-to-layer mapping $i = 0, 1, \ldots M_{symb}^{layer} - 1$ | |
|---|---|---|---|
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 2)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

FIG. 16 shows another example of layer-antenna port mapping according to a proposed invention.

FIG. 16 shows layer-antenna port mapping when the number of codeword is 1. In FIG. 16-(a), the number of layers is 1, and a layer 0 is mapped to an antenna port 7 including a first CDM set. In FIG. 16-(b), the number of layers is two, and layers 0 and 1 are mapped to respective antenna ports 7 and 8 included in a first CDM set. In FIG. 16-(c), the number of layers is three, and layers 0 and 1 are mapped to respective antenna ports 7 and 8 included in a first CDM set. A layer 2 is mapped to an antenna port 9 included in a second CDM set. In FIG. 16-(d), the number of layers is four, and layers 0 and 1 are mapped to respective antenna ports 7 and 8 included in a first CDM set. Layers 2 and 3 are mapped to respective antenna ports 9 and 10 included in a second CDM set.

FIGS. 17 to 21 show other examples of layer-antenna port mapping according to a proposed invention. FIGS. 17 to 21 show layer-antenna port mapping when the number of codewords is two.

Figure 17:
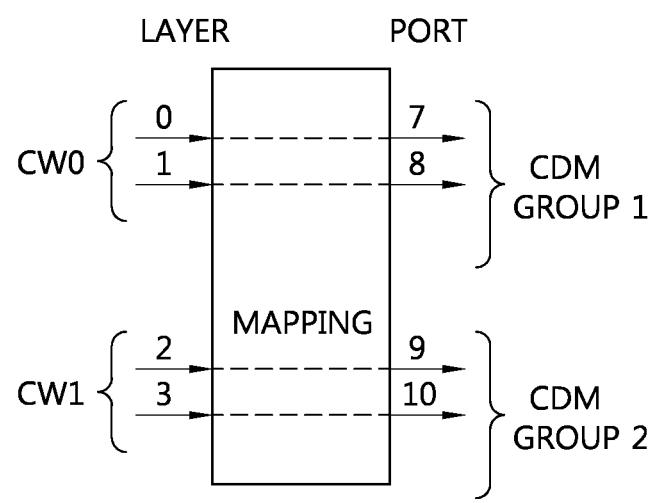
FIGS. 17 to 21 show other examples of layer-antenna port mapping according to a proposed invention.

In FIG. 17, the number of layers is four. A first CDM set includes antenna ports 7 and 8, and a second CDM set includes antenna ports 9 and 10. Layers 0 and 1 are mapped to the respective antenna ports 7 and 8, and layers 2 and 3 are mapped to the respective antenna ports 9 and 10.

Figure 18:
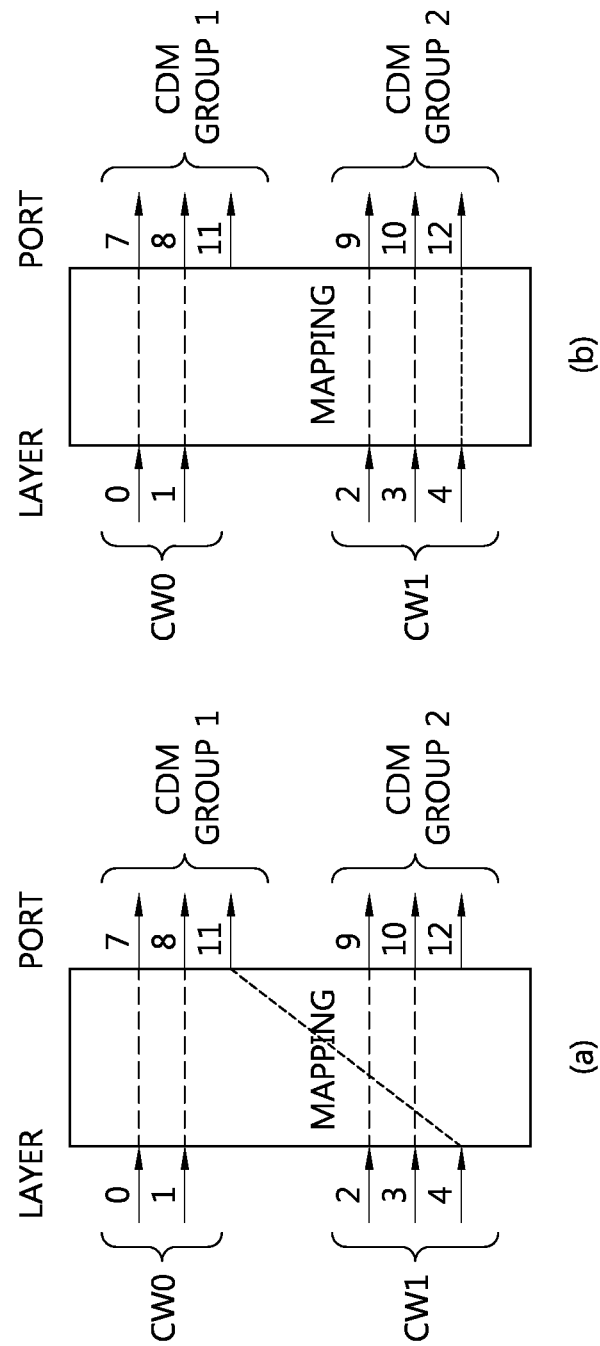

In FIG. 18, the number of layers is five. A first CDM set includes antenna ports 7, 8, and 11, and a second CDM set includes antenna ports 9, 10, and 12. Like in FIG. 17, layers 0 and 1 are mapped to the respective antenna ports 7 and 8, and layers 2 and 3 are mapped to the respective antenna ports 9 and 10. A layer 4 newly added in FIG. 17 may be mapped to an antenna port included in the first CDM set or an antenna port included in the second CDM set. In FIG. 18-(a), the layer 4 is mapped to the antenna port 11. In FIG. 18-(b), the layer 4 is mapped to the antenna port 12. Accordingly, antenna ports mapped to each CDM set can be maintained. Regarding for a layer index 0 to a layer index 3 used when the number of layers is four, the indices of layers mapped to each CDM set can be maintained. Accordingly, there is an advantage in that the same channel estimator can be used irrespective of the number of layers when channel estimation is performed.

Figure 19:
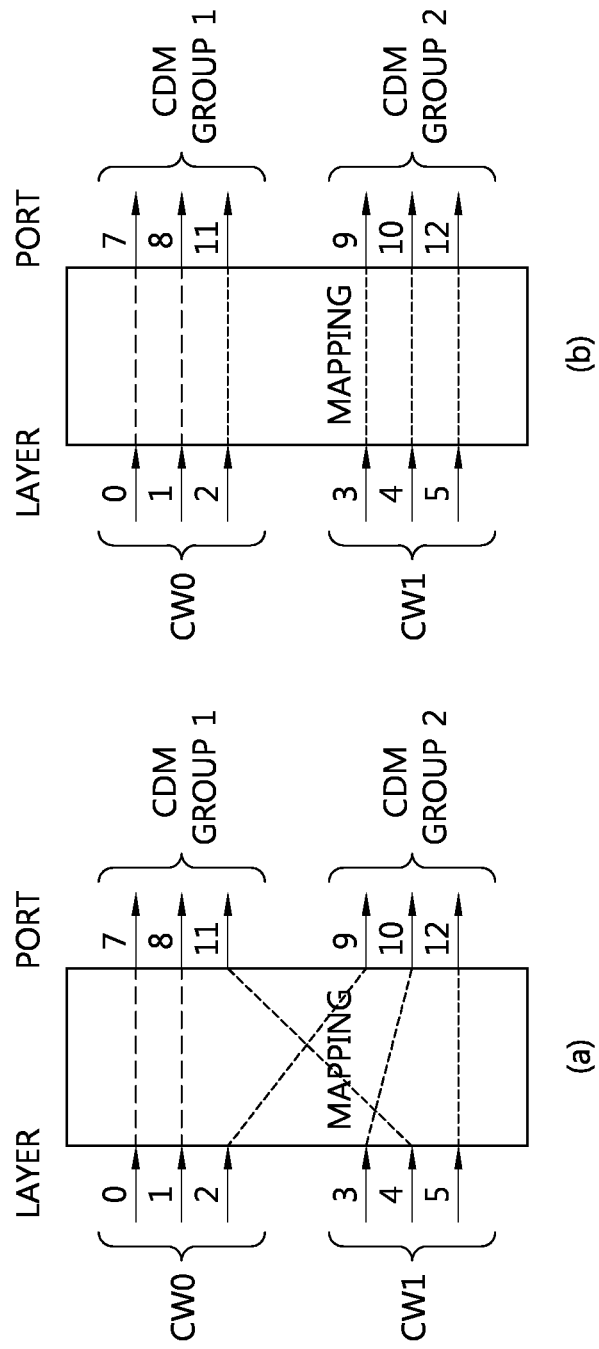

In FIG. 19, the number of layers is six. Like in FIG. 18, a first CDM set includes antenna ports 7, 8, and 11, and a second CDM set includes antenna ports 9, 10, and 12. In FIG. 19-(a), like in FIG. 18-(a), layers 0, 1, and 4 are mapped to the respective antenna ports 7, 8, and 11, and layers 2 and 3 are mapped to the respective antenna ports 9 and 10. A layer 5 newly added in FIG. 18-(a) is mapped to the antenna port 12. Accordingly, antenna ports mapped to each CDM set can be maintained, and an antenna port to which each layer is mapped is also maintained. In FIG. 19-(b), layers 0 to 2 are mapped to the respective antenna ports 7, 8, and 11, and layers 3 to 5 are mapped to the respective antenna ports 9, 10, and 12. Accordingly, antenna ports mapped to each CDM set is maintained.

Figure 20:
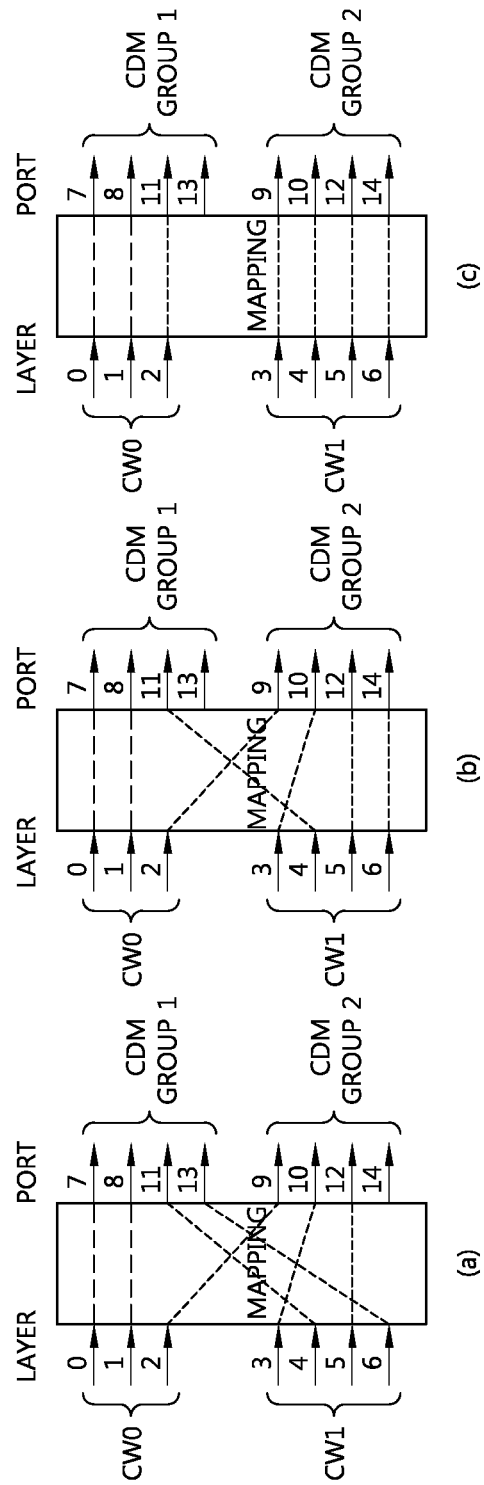

In FIG. 20, the number of layers is seven. A first CDM set includes antenna ports 7, 8, 11 and 13, and a second CDM set includes antenna ports 9, 10, 12, and 14. Referring first to FIGS. 20-(a) and 20-(b), like in FIG. 19-(a), layers 0, 1, and 4 are mapped to the respective antenna ports 7, 8, and 11, and layers 2, 3, and 5 are mapped to the respective antenna ports 9, 10, and 12. A layer 6 newly added in FIG. 19-(a) may be mapped to an antenna port included in the first CDM set or may be mapped to an antenna port included in the second CDM set. In FIG. 20-(a), the layer 6 is mapped to the antenna port 13. In FIG. 20-(b), the layer 6 is mapped to the antenna port 12. Accordingly, antenna ports mapped to each CDM set can be maintained, and an antenna port to which each layer is mapped is also maintained. In FIG. 20-(c), layers 0, 1, and 2 are mapped to the respective antenna ports 7, 8, and 11, and layer 3 to 6 are mapped to the respective antenna ports 9, 10, 12, and 14. Accordingly, antenna ports mapped to each CDM set are maintained.

Figure 21:
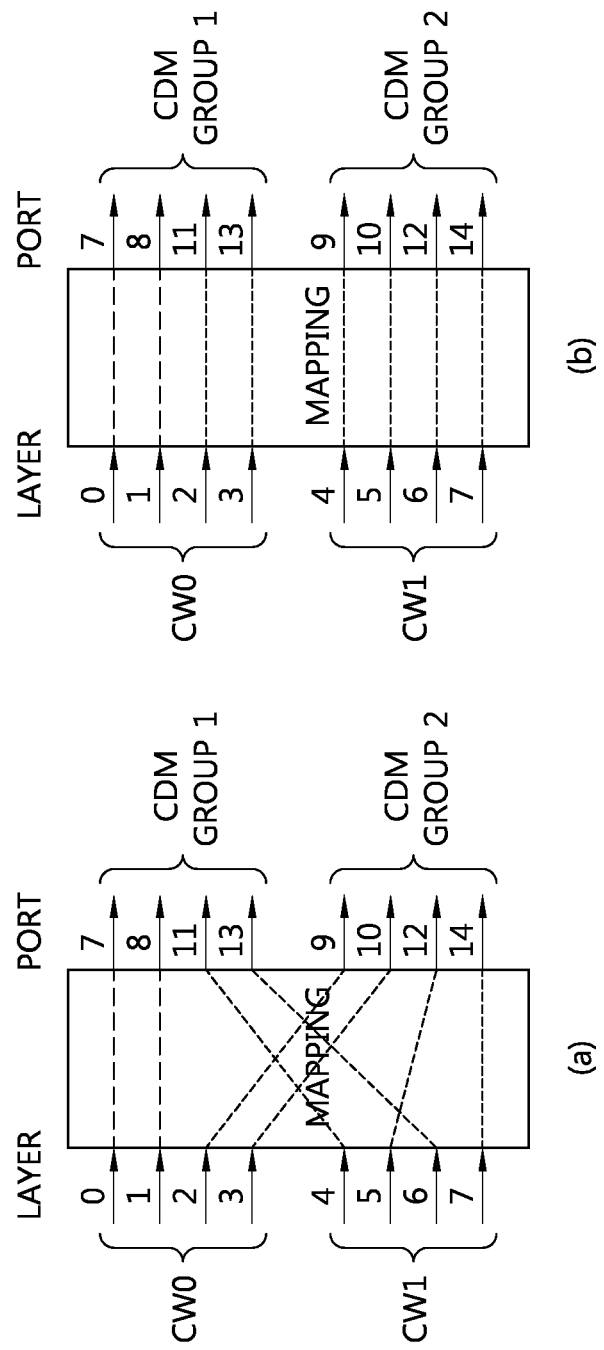

In FIG. 21, the number of layers is eight. Like in FIG. 20, a first CDM set includes antenna ports 7, 8, 11, and 13, and a second CDM set includes antenna ports 9, 10, 12, and 14. In FIG. 21-(a), like in FIG. 19-(a), layers 0, 1, 4, and 6 are mapped to the respective the antenna ports 7, 8, 11, and 13, and layers 2, 3, 5, and 7 are mapped to the respective antenna ports 9, 10, 12, and 14. A layer 7 newly added in FIG. 20-(a) is mapped to the antenna port 14. Accordingly, antenna ports mapped to each CDM set can be maintained, and an antenna port to which each layer is mapped is also maintained. In FIG. 21-(b), layers 0 to 3 are mapped to the respective antenna ports 7, 8, 11, and 13, and layers 4 to 7 are mapped to the respective antenna ports 9, 10, 12, and 14. Accordingly, antenna ports mapped to each CDM set are maintained.

When the number of layers is an even number, a power imbalance problem between the DMRSs of a plurality of layers in each OFDM symbol at the time of antenna port-CDM set mapping or layer-CDM set mapping can be solved through the proposed invention. When the number of layers is an odd number, the proposed invention may be applied and, at the same time, there may be a power offset between layers in order to control power between the DMRSs of layers having irregular power. Here, power allocated to the DMRSs of layers may be distributed so that it is identical with the power of one RE allocated to data based on one OFDM symbol, not power allocated to data. Accordingly, although the number of layers is an odd number, a power imbalance problem between the DMRSs of a plurality of layers can be solved.

Figure 22:
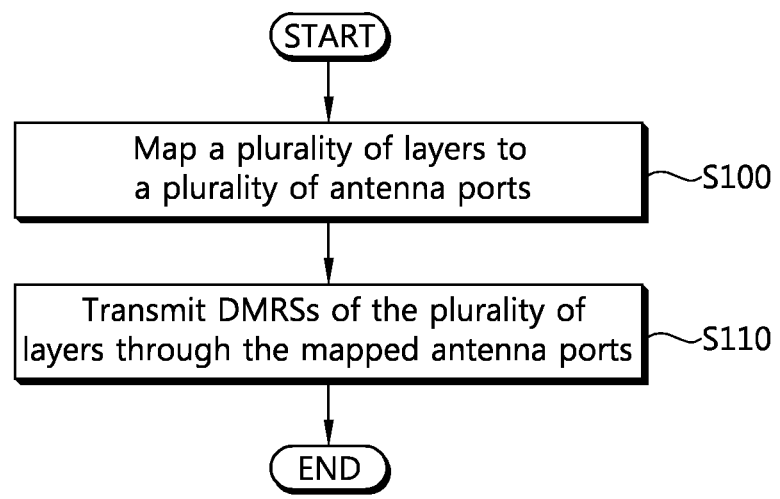
FIG. 22 shows an embodiment of a proposed method for mapping a plurality of layers to a plurality of antenna ports.

FIG. 22 shows an embodiment of a proposed method for mapping a plurality of layers to a plurality of antenna ports.

At step S100, a BS maps a plurality of layers to a plurality of antenna ports, respectively. At step S110, the BS transmits the DMRSs of the plurality of layers through the respective antenna ports.

Figure 23:
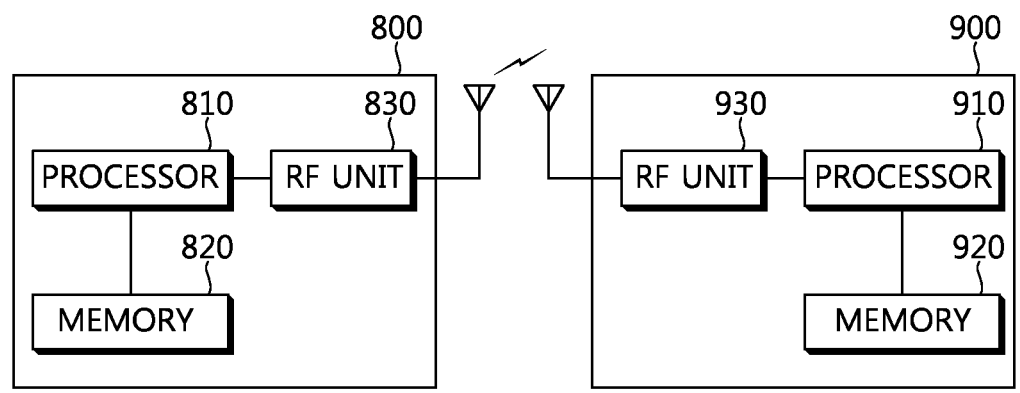
FIG. 23 is a block diagram of a BS and UE in which the embodiments of the present invention are embodied.

FIG. 23 is a block diagram of a BS and UE in which the embodiments of the present invention are embodied.

The BS 800 includes a processor 810, memory 820, and a radio frequency (RF) unit 830. The processor 810 embodies the proposed functions, processes and/or methods. The processor 810 maps a plurality of layers to a plurality of antenna ports, respectively, and maps the DMRSs of the plurality of layers to a first CDM set or a second CDM set. The layers of a radio interface protocol may be embodied by the processor 810. The memory 820 is connected to the processor 810, and it stores various pieces of information for driving the processor 810. The RF unit 830 is connected to the processor 810, and it transmits the DMRSs through the plurality of antenna ports.

The UE 900 includes a processor 910, memory 920, and an RF unit 930. The RF unit 930 is connected to the processor 910, and it transmits and/or receives radio signals. The processor 910 embodies the proposed functions, processes and/or methods. The layers of a radio interface protocol may be embodied by the processor 910. The memory 920 is connected to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art. In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of allocating a plurality of layers to a plurality of antenna ports in a wireless communication system, the method comprising:

mapping the plurality of layers to the plurality of antenna port, respectively;

mapping demodulation reference signals (DMRSs) of the plurality of layers to a first code division multiplexing (CDM) set or a second CDM set among radio resources and transmitting the DMRSs through the plurality of antenna ports;

wherein the DMRSs mapped to a first CDM set in a first resource block (RB), from among the DMRSs of the plurality of layers, are mapped to a second CDM set in a second RB different from the first RB;

the DMRSs mapped to a second CDM set in the first RB, from among the DMRSs of the plurality of layers, are mapped to a first CDM set in the second RB different from the first RB;

wherein the first CDM set occupies a Resource Element (RE) allocated to first, sixth, and eleventh subcarriers of sixth and seventh Orthogonal Frequency Division Multiplexing (OFDM) symbols of each slot;

the second CDM set occupies an RE allocated to second, seventh, and twelfth subcarriers of sixth and seventh OFDM symbols of each slot.

2. The method of claim 1, wherein a number of the plurality of layers is an odd number.

3. The method of claim 1, wherein the DMRSs of the plurality of layers are mapped to a predetermined CDM set irrespective of a number of the plurality of layers.

4. The method of claim 1, wherein the first CDM set or the second CDM set is mapped to predetermined specific antenna ports of the plurality of antenna ports irrespective of the number of the plurality of layers.

5. The method of claim 4, wherein antenna ports mapped to the first CDM set and antenna ports mapped to the second CDM set are mutually exclusively.

6. The method of claim 1, wherein a maximum of four layers in the first CDM set or the second CDM set are multiplexed according to a CDM method based on an orthogonal code.

7. The method of claim 6, wherein a length of the orthogonal code is 4.

8. The method of claim 1, wherein the DMRSs of the plurality of layers are transmitted with identical power.

9. An apparatus in a wireless communication system, comprising:

a radio frequency (RF) unit for transmitting demodulation reference signals (DMRSs) of a plurality of layers through a plurality of antenna ports;

a processor connected to the RF unit, wherein the processor is configured for:

mapping the plurality of layers to the plurality of antenna ports respectively;

mapping the DMRSs of the plurality of layers to a first code division multiplexing (CDM) set or a second CDM set of radio resources;

wherein the DMRSs mapped to a first CDM set in a first resource block (RB), from among the DMRSs of the plurality of layers, are mapped to a second CDM set in a second RB different from the first RB;

the DMRSs mapped to a second CDM set in the first RB, from among the DMRSs of the plurality of layers, are mapped to a first CDM set in the second RB different from the first RB;

wherein the first CDM set occupies a Resource Element (RE) allocated to first, sixth, and eleventh subcarriers of sixth and seventh Orthogonal Frequency Division Multiplexing (OFDM) symbols of each slot;

the second CDM set occupies an RE allocated to second, seventh, and twelfth subcarriers of sixth and seventh OFDM symbols of each slot.

10. The apparatus of claim 9, wherein a number of the plurality of layers is an odd number.

11. The apparatus of claim 9, wherein the DMRSs of the plurality of layers are mapped to a predetermined CDM set irrespective of a number of the plurality of layers.

12. The apparatus of claim 9, wherein the first CDM set or the second CDM set is mapped to predetermined specific antenna ports of the plurality of antenna ports irrespective of the number of the plurality of layers.

* * * * *